(12) United States Patent
Ishihara

(10) Patent No.: US 9,661,302 B2
(45) Date of Patent: May 23, 2017

(54) DEPTH INFORMATION ACQUISITION APPARATUS, IMAGING APPARATUS, DEPTH INFORMATION ACQUISITION METHOD AND PROGRAM

(71) Applicant: CANON KABUSHIKI KAISHA, Tokyo (JP)

(72) Inventor: Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 13/966,443

(22) Filed: Aug. 14, 2013

(65) Prior Publication Data
US 2014/0055577 A1 Feb. 27, 2014

(30) Foreign Application Priority Data
Aug. 27, 2012 (JP) ................... 2012-186678

(51) Int. Cl.
*H04N 13/02* (2006.01)
*G06T 7/571* (2017.01)

(52) U.S. Cl.
CPC ........... *H04N 13/021* (2013.01); *G06T 7/571* (2017.01); *H04N 13/0235* (2013.01); *G06T 2207/20056* (2013.01)

(58) Field of Classification Search
CPC .................................................. H04N 13/021
See application file for complete search history.

(56) References Cited

U.S. PATENT DOCUMENTS 4,965,840 A 10/1990 Subbarao

FOREIGN PATENT DOCUMENTS

JP H01-167610 A 7/1989
JP 2010-016743 A 1/2010

*Primary Examiner* — James Pontius
(74) *Attorney, Agent, or Firm* — Fitzpatrick, Cella, Harper & Scinto

(57) ABSTRACT

A depth information acquisition apparatus acquires depth information of a subject by using two real space images, each having a different blur value, that are obtained by capturing a subject with different imaging parameters. A processor and a memory store instructions that cause the processor to perform converting the two real space images into two frequency space images, each having a frequency including at least one frequency ingredient and an amplitude. A frequency space phase image is generated for each of the frequency space images by dividing each frequency ingredient by the amplitude of each respective frequency space image using a frequency. Frequency space correlation value information representing a correlation value for each frequency between the frequencies of the two frequency space phase images is calculated. The frequency space correlation value information is converted into real space correlation value information having a peak maximum value.

14 Claims, 13 Drawing Sheets

DEPTH INFORMATION ACQUISITION APPARATUS, IMAGING APPARATUS, DEPTH INFORMATION ACQUISITION METHOD AND PROGRAM

CLAIM OF PRIORITY

This application claims the benefit of Japanese Patent Application No. 2012-186678, filed on Aug. 27, 2012, which is hereby incorporated by reference herein in its entirety.

BACKGROUND OF THE INVENTION

Field of the Invention

The present invention relates to a depth information acquisition apparatus, an image pickup apparatus, a depth information acquisition method, and a program.

Description of the Related Art

Conventionally, as a depth information acquisition method of indicating a depth to a subject in an image, an acquisition method using a Depth from Defocus (DFD) method has been proposed, as disclosed in Japanese Patent Application Publication No. H1-167610. In a DFD method, a plurality of images having different blur are captured by controlling the imaging parameters of the imaging optical system, and the correlation value of the blur between a plurality of captured images is calculated by using a processing object pixel, and peripheral pixels thereof, in the plurality of captured images. This correlation value of the blur varies with the depth to the subject in the image. In a DFD method, depth information is acquired from the blur correlation value, on the basis of the relationship between the blur correlation value and the distance. In a DFD method, it is possible to acquire depth information by one imaging system. Therefore, a depth information acquisition method based on a DFD method is advantageous in that it can be incorporated into a commercially available image pickup apparatus.

Furthermore, Japanese Patent Application Publication No. 2010-016743 discloses an apparatus that calculates a correlation value of the blur in pixel units, for each pixel in a processing object region, from a plurality of images having different blur that are captured using different imaging parameters.

However, the brightness and chromaticity of the image also vary if the image is blurred. In the method disclosed in Japanese Patent Application Publication No. H1-167610, the correlation value of the blur between a plurality of images depends on the brightness and the chromaticity of the images, and the accuracy of the acquired depth information declines depending on the image.

In view of problems of this kind, in the method disclosed in Japanese Patent Application Publication No. 2010-016743, the accuracy of the acquired depth information is raised by setting a weighting coefficient for each pixel unit, for the blur correlation value, and finding a weighted average of the blur correlation value on the basis of the weighting coefficients. However, since the brightness and the chromaticity of the image changes with the blur, then it is difficult to set an optimal weighing coefficient for each pixel unit, and it has been difficult to satisfactorily suppress variation in the correlation value that is dependent on the spatial frequency of the subject. Therefore, it has been difficult to acquire highly accurate depth information.

SUMMARY OF THE INVENTION

It is an object of the present invention to provide technology for reducing the effects of image brightness and chromaticity on the depth information representing the depth to the subject, and depth information of high accuracy can be acquired more reliably.

The present invention provides, in another aspect, a depth information acquisition apparatus acquiring depth information of a subject by using two real space images, each having a different blur value, that are obtained by capturing a subject with different imaging parameters. The apparatus comprises a processor, and a memory storing instructions that, when executed by the processor, cause the processor to perform the steps of converting the two real space images into two frequency space images, the frequency space images each having a frequency comprising at least one frequency ingredient and an amplitude, generating a frequency space phase image for each of the frequency space images by dividing each frequency ingredient by the amplitude of each respective frequency space image, each frequency space phase image using a frequency, calculating frequency space correlation value information representing a correlation value for each frequency between the frequencies of the two frequency space phase images, converting the frequency space correlation value information into real space correlation value information, the real space correlation value information using a peak maximum value, and acquiring depth information, based on the peak maximum value of the real space correlation value information.

The image pickup apparatus according to the present invention includes the depth information acquisition apparatus described above.

The present invention, in another aspect, provides a depth information acquisition method of acquiring depth information of a subject by using two real space images, each having a different blur value, that are obtained by capturing a subject with different imaging parameters. The method comprises a step of converting the two real space images to two frequency space images, a step of generating a frequency space phase image by dividing each frequency ingredient by the amplitude of each frequency ingredient of the frequency space images in two frequency space images, a step of calculating frequency space correlation value information representing a correlation value for each frequency between the two frequency space phase images, a step of converting the frequency space correlation value information into real space correlation value information, and a step of acquiring depth information of a subject, on the basis of characteristics of a peak of the real space correlation value information.

The program according to the present invention causes a computer to execute the steps of the depth information acquisition method described above.

According to the present invention, the effects of image brightness and chromaticity on depth information representing a depth to a subject are reduced, and depth information of high accuracy can be acquired more reliably.

Further features of the present invention will become apparent from the following description of exemplary embodiments with reference to the attached drawings.

DESCRIPTION OF THE EMBODIMENTS

First Embodiment

Below, a depth information acquisition apparatus, an image pickup apparatus, a depth information acquisition method, and a program relating to a first embodiment of the present invention will be described with reference to the drawings.

Figure 1:
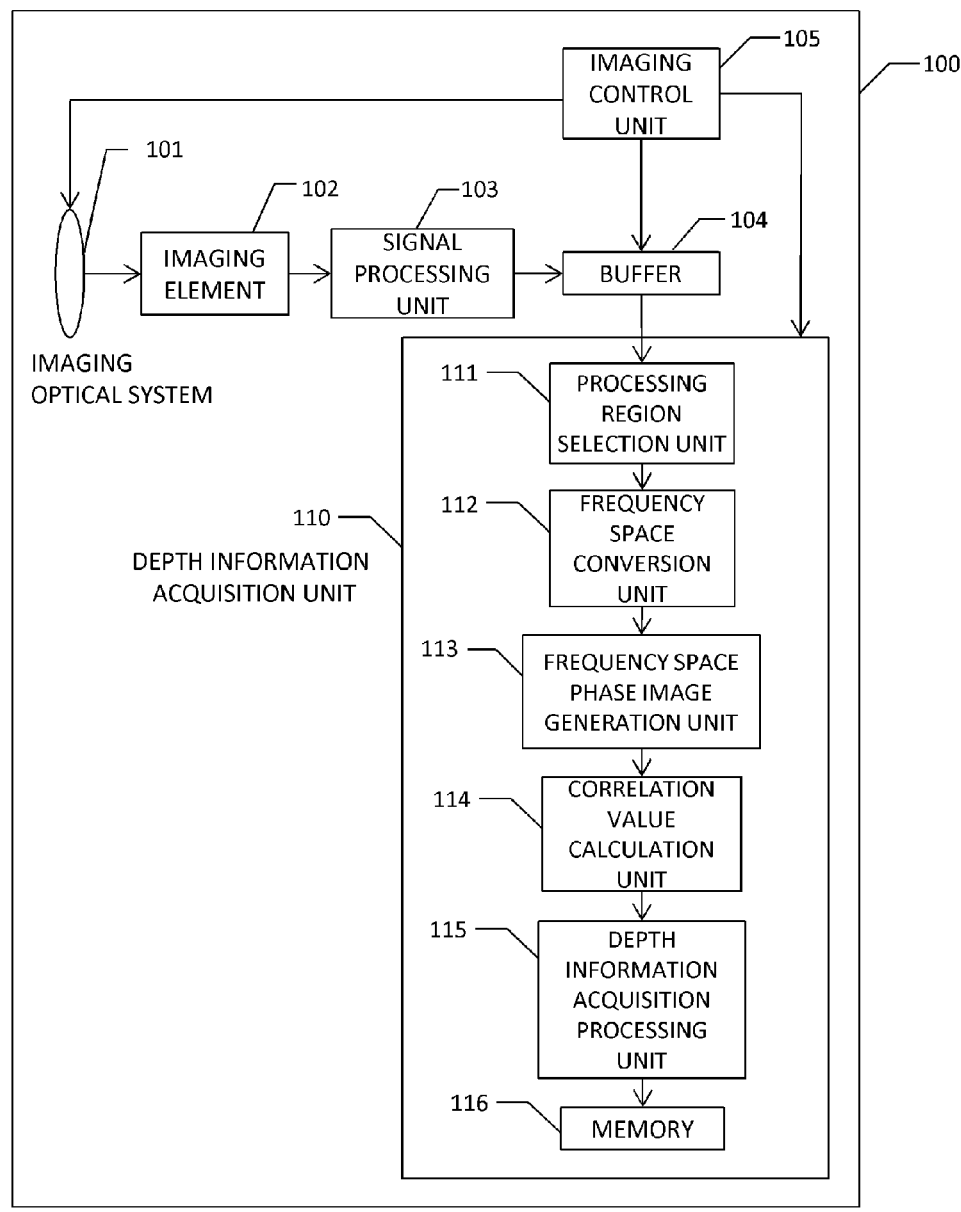
FIG. 1 is a block diagram showing a composition of an imaging apparatus relating to a first embodiment of the present invention.

FIG. 1 shows one example of a composition of an image pickup apparatus 100 relating to the present embodiment. The image pickup apparatus 100 includes an imaging optical system 101, an imaging element 102, a signal processing unit 103, a buffer 104, an imaging control unit 105, a depth information acquisition unit 110, and the like. The depth information acquisition unit 110 includes a processing region selection unit 111, a frequency space conversion unit 112, a frequency space phase image generation unit 113, a correlation value calculation unit 114, a depth information acquisition processing unit 115, a memory 116, and the like.

The depth information acquisition unit 110 (depth information acquisition apparatus) may be an apparatus that is separate from the image pickup apparatus 100. The respective functions of the depth information acquisition unit 110 (for example, the processing region selection unit 111, the frequency space conversion unit 112, the frequency space phase image generation unit 113, the correlation value calculation unit 114, and the depth information acquisition processing unit 115) may be achieved by a computer (CPU) executing a program stored in a memory, for example.

The imaging optical system 101 focuses an image of a subject on an imaging element 102, and is, for example, a zoom lens of a compact camera, a fixed-focus lens of a single-lens reflex camera, a zoom lens, or a lens for a mobile phone camera.

The imaging element 102 is a single-plate type of imaging element or a three-plate type of imaging element. If the imaging element 102 is a single-plate type of imaging element, then the color filter is an RGB color filter or a complementary color filter with a Bayer configuration.

The signal processing unit 103 reads in the image focused on the imaging element 102, applies signal processing, such as AD conversion, noise elimination, demosaicing, brightness signal conversion, correction of aberration, magnification rate correction, positional alignment, and the like, to the image that has been read in and stores the signal in the buffer 104.

There is no need to carry out all of the signal processing steps described above. It is also possible to carry out only the processing necessary in order to acquire depth information that represents a depth to the subject. Therefore, the images accumulated in the buffer 104 may be images before demosaicing, or may be RGB images after demosaicing. The images accumulated in the buffer 104 may be YUV images. The images accumulated in the buffer 104 may be images having brightness only. However, the signal processing carried out by the signal processing unit 103 should be signal processing that does not alter the blur produced by the imaging optical system 101, and in particular, should be signal processing that corrects noise that affects the depth information.

Furthermore, apart from an image for acquiring depth information, it is also possible to generate an image obtained by a normal pickup apparatus (for example, an ornamental image), by normal image processing, and to store this image in a memory (not illustrated), or the like.

The imaging control unit 105 carries out control for capturing two images that are required to acquire depth information. In the present embodiment, the imaging control unit 105 performs control to capture a second image by changing the imaging parameters, after capturing a first image. Therefore, the same signal processing is applied to the two images (the two images having different blur that are captured with different imaging parameters), and the images are stored in the buffer 104. Here, the two images that are stored in the buffer 104 are images in a real space (real space images). The changed imaging parameters are the focal position of the imaging optical system 101, the size of the aperture opening in the imaging optical system 101, the focal distance, and the like. In the present embodiment, two images are captured by varying the size of the aperture opening in the imaging optical system 101. More specifically, two images are captured using an F value of F/4 and an F value of F/8. The two images that are stored in the buffer 104 are used by the depth information acquisition unit 110 when acquiring depth information.

In this embodiment, an example is described in which depth information is acquired by using two images, but the number of images used to acquire depth information is not limited to two. For example, depth information may also be acquired by using three or more images having different blur, which are captured using different imaging parameters.

The depth information acquisition unit 110 acquires depth information representing a depth to a subject, using two real space images having different blur, which are captured using different imaging parameters. In the present embodiment, the depth information is acquired as a depth score that changes in accordance with the distance from the focal position. The depth score has a high value when the subject is in the vicinity of the focal position, and has a low value when the subject is distant from the focal position.

Furthermore, the depth information acquisition unit 110 may calculate the actual depth, as the depth information. The actual depth can be calculated from the depth score, on the basis of the parameters of the imaging optical system. The parameters of the imaging optical system for calculating the actual depth are the focal distance, the F value, the position of the focusing lens, and so on.

Figure 2:
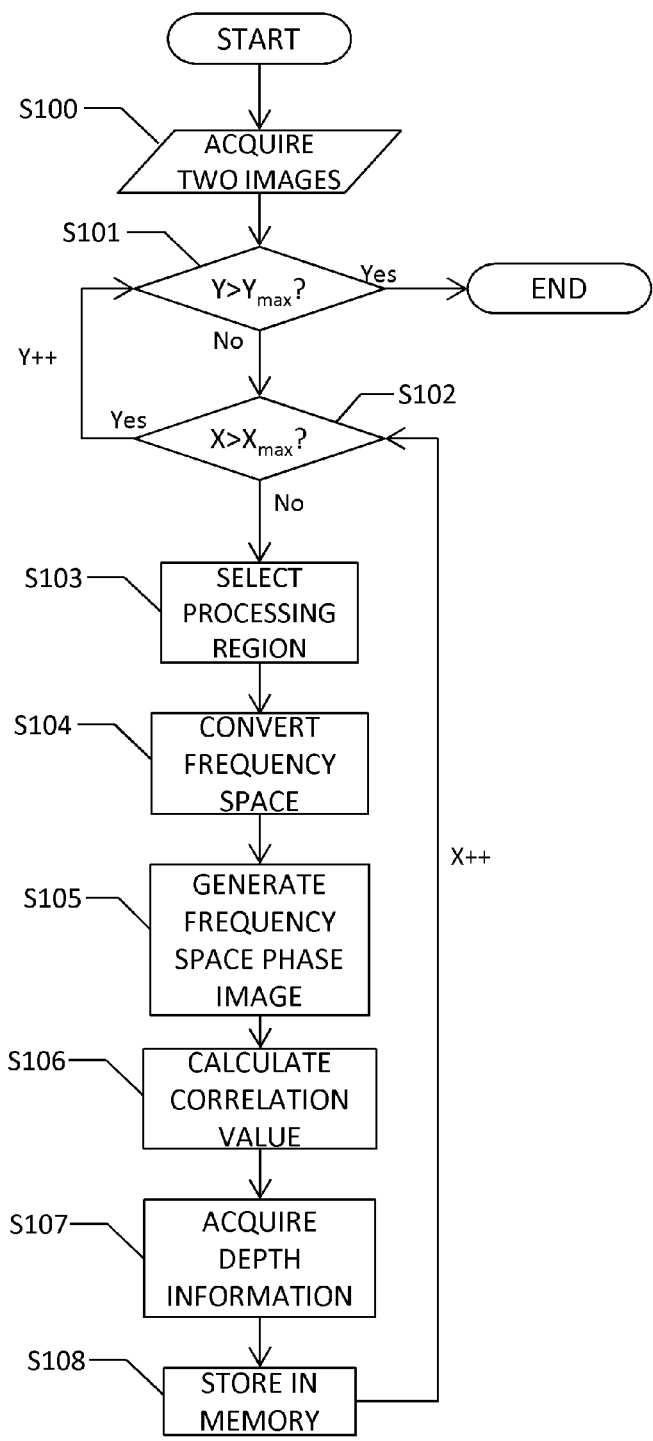
FIG. 2 is a flowchart of a depth information acquisition unit relating to a first embodiment of the present invention.

In the present embodiment, the depth information is acquired by using a DFD method. The detailed operation of the depth information acquisition unit 110 is described here with reference to the flowchart in FIG. 2.

Imaging is carried out by varying the imaging parameters, and when two real space images have been stored in the buffer 104, the two real space images are sent to the depth information acquisition unit 110, and the depth information acquisition processing is started. These two real space images are called "real space images I1 and I2".

When the depth information acquisition process is started, the image acquisition unit (not illustrated) of the depth information acquisition unit 110 acquires the real space images I1, I2 from the buffer 104 (S100). The depth information acquisition unit 110 acquires depth information for each pixel by using these two real space images. Since the depth information can be acquired for each pixel, it is possible to measure the depth (acquire depth information) at each pixel. However, there is no need to acquire the depth information with respect to all of the pixels, and it is also possible to acquire depth information for every other certain number of pixels, or to acquire depth information only with respect to predetermined pixels. In the present embodiment, since the depth information is acquired with respect to all of the pixels in pixel units, then the processing object pixel specification unit (not illustrated) scans the X,Y coordinates in the image to specify the processing object pixel (the pixel that is the object of depth information acquisition).

In a depth information acquisition process based on a DFD method, the pixels that are peripheral to the processing object pixel are required. Therefore, after the processing object pixel has been specified, the processing region selection unit 111 selects an image region including the processing object pixel, as a selected region image, from each of the two real space images (real space images I1 and I2) (S103). In this case, it is generally necessary to select (extract) the same region in the two captured real space images I1 and I2. The selected region image extracted from the real space image I1 (an image region including the processing object pixel and the peripheral pixels thereof) is called the selected region image C1, and the selected region image extracted from the real space image I2 is called the selected region image C2. The size of the extracted region (the extracted region size) should be small in order to shorten the processing time, but should be sufficiently large to derive a stable solution in which the effects of noise are suppressed. Furthermore, the extracted region size may be specified in accordance with the magnitude of the blur in the captured image. In the case of a compact digital camera, the imaging element size is small and the blur is also small, and therefore, it is possible to set the extracted region to a small size. More specifically, the extracted region size in the case of a compact digital camera may be a square region having edges approximately ten pixels long in order to achieve high-speed processing, and may be a square region having edges approximately sixty pixels long in order to suppress the effects of noise. To achieve a good balance between these two factors, the extracted region size is desirably a square region having edges approximately fifteen to thirty pixels long. The selection region images C1, C2 are real space images.

The frequency space conversion unit 112 receives two selected region images extracted by the processing region selection unit 111, from the processing region selection unit 111. The frequency space conversion unit 112 then converts the two selected region images described above into two frequency space images, by performing processing for converting from a real space to a frequency space (S104). In the present embodiment, the selected region image C1 is converted to a frequency space image F1 by a two-dimensional Fourier transform, and the selected region image C2 is converted to a frequency space image F2.

The frequency space phase image generation unit 113 generates a frequency space phase image by aligning the amplitude of the frequency space images, respectively, from each of the two frequency space images F1, F2 (S105). In the present embodiment, the amplitude of the frequency space image is divided by this amplitude. Consequently, the amplitude of the frequency space image is aligned to "1". In the present embodiment, a frequency space phase image FP1 is generated from the frequency space image F1, and a frequency space phase image FP2 is generated from the frequency space image F2.

When the amplitude is aligned to "1" by this process, the brightness information is erased, and only phase information remains. The real space phase image represents this phase image in a real space, and gives a good representation of the outline. The frequency space phase image represents the real space phase image in a frequency space.

A correlation value calculation unit 114 calculates frequency space correlation value information representing a correlation value for each frequency between two frequency space phase images, using the two frequency space phase images FP1, FP2. The correlation value calculation unit 114 converts the frequency space correlation value information into real space correlation value information, by processing for reverse conversion from the frequency space to the real space (S106). In the present embodiment, the frequency space correlation value information is converted (reverse converted) into real space correlation value information by a two-dimensional inverse Fourier transform. The real space correlation value information obtained from the frequency space correlation value information is called phase image correlation value information PCC. A change in the phase image (an image represented by phase information only) gives a good representation of change in blur that occurs due to capturing images using different image parameters, and, therefore, the phase image correlation value information PCC gives a good representation of the image blur information. It is possible to acquire depth information using at least one characteristic of the characteristics of this phase image correlation value information PCC.

The calculation of the frequency correlation value information and the conversion from frequency correlation value information to real space correlation value information can be achieved by respectively different functional units.

The depth information acquisition processing unit 115 acquires depth information representing a depth to a subject, on the basis of the peak characteristics of the phase image correlation value information PCC that is calculated by the correlation value calculation unit 114 (S107). In the present embodiment, the depth information is acquired on the basis of the maximum value of the peak of the phase image correlation value information PCC. Here, the "peak of the phase image correlation value information PCC" means the peak having the maximum value of the phase image correlation value information PCC. Only one peak occurs when using two real space images that are obtained by capturing the same subject.

The depth information acquisition processing unit 115 stores the acquired depth information in the memory 116 (S108).

Figure 3:
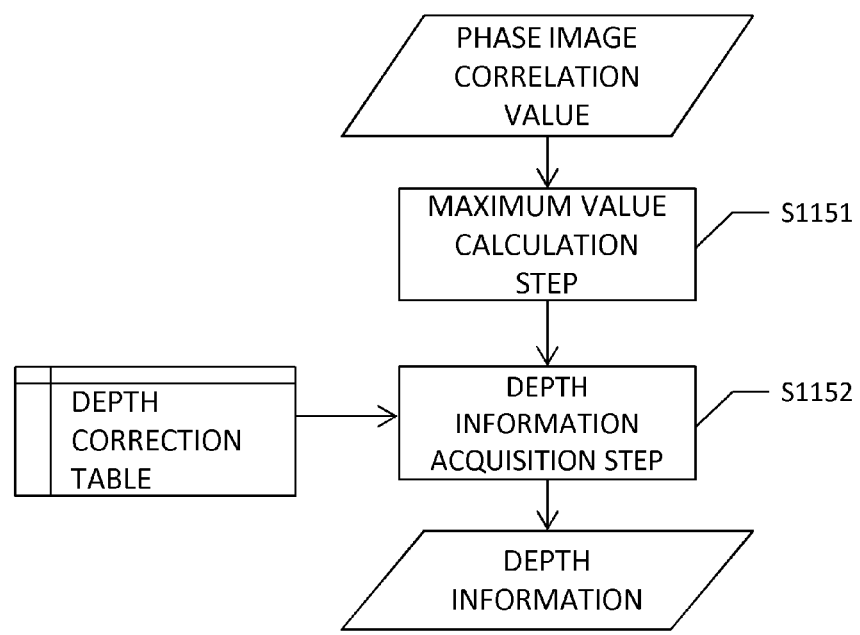
FIG. 3 is a flowchart of a depth information acquisition processing unit relating to a first embodiment of the present invention.

FIG. 3 shows a flowchart of the depth information acquisition processing unit 115.

A maximum value of the phase image correlation value information PCC is calculated (determined) in a maximum value calculation step S1151. The maximum value of the phase image correlation value information PCC is related to the depth to the subject (for example, the distance from the focal position to the subject: the amount of defocus), and the depth information is acquired on the basis of this relationship. When the subject is situated at the focal position, then the maximum value of the phase image correlation value information PCC is "1", and this maximum value then approaches "0" as the subject becomes more distant from the focal position. It is possible to judge that the subject is situated at the focal position (in the focal plane) only when the maximum value is "1", or to judge that the subject is situated at the focal position when the maximum value close to "1". It is possible to judge that the subject is situated at a position of infinity from the focal position when the maximum value is "0", and it is also possible to set a threshold value, and to judge that the subject is situated at a position of infinity from the focal position, or to judge that the subject is at a "distant position" rather than a "position of infinity", when the maximum value is not more than the threshold value.

It is also possible to calculate a correspondence relationship between the peak characteristics of the phase image correlation value information PCC (more specifically, the maximum value of the phase image correlation value information PCC), and the depth information, in advance, and to prepare correspondence information (a depth correction table) representing this correspondence relationship. More accurate depth information can be acquired by storing the depth correction table of this kind previously in a memory, or the like, and using the depth correction table when acquiring depth information.

In the depth information acquisition step S1152, an accurate depth to the subject is acquired on the basis of the maximum value of the phase image correlation value information PCC (peak characteristics) and the depth correction table that has been prepared in advance.

Figure 4:
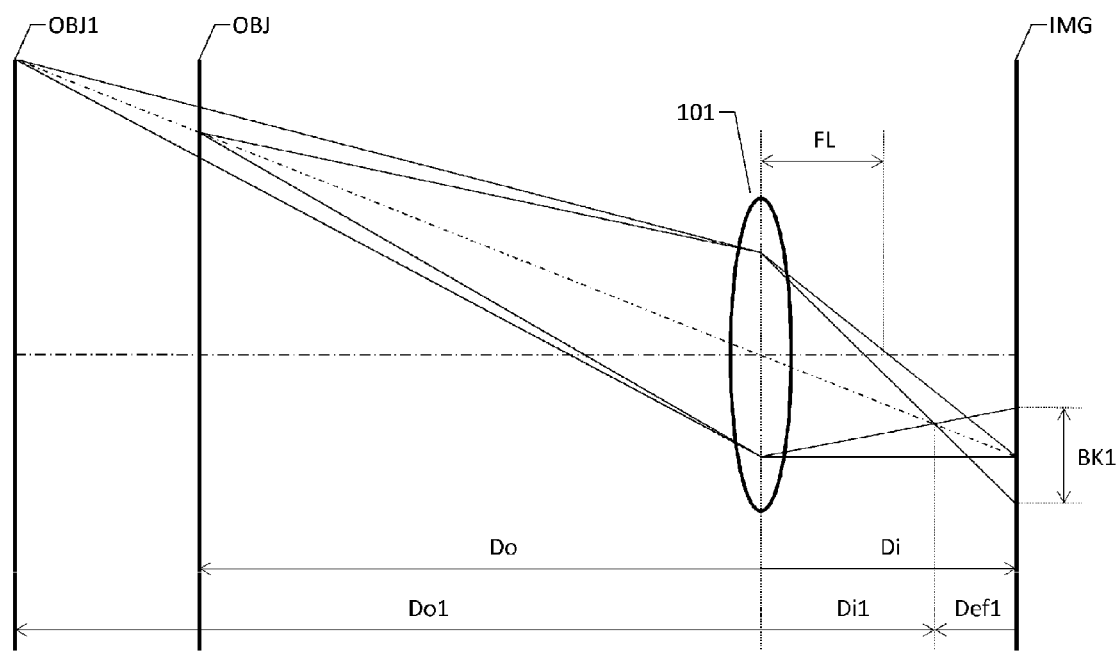
FIG. 4 is an illustrative diagram of an image focusing relationship.

FIG. 4 shows an image focusing relationship in the imaging optical system.

The principles of the depth information acquisition process based on a DFD method according to the present embodiment will be described here with reference to FIG. 4.

An object depth Do of an object OBJ can be determined from Formula 1, provided that the image depth Di and the focal distance FL of the imaging optical system are known.

$$(1/Do)+(1/Di)=(1/FL) \quad \text{(Formula 1)}$$

However, normally, it is only possible to determine the depth by Formula 1 in the case of an object that is focused on the imaging plane.

With the DFD method according to the present embodiment, in order to calculate the object depth Do1 of the object OBJ1 that is not formed on the imaging plane, an image depth Di1 of the object OBJ1 is determined from the phase image correlation value information PCC that relates to the amount of defocus BK1, and this value is substituted into Formula 1. In this way, the object depth Do1 is calculated.

More specifically, an amount of defocus Def1 is determined from the phase image correlation value information PCC, an image depth Di1 of the object under calculation OBJ1 is determined from this amount of defocus Def1, and hence, the object depth Do1 of the object that is not focused on the imaging plane can be calculated.

The relationship between the amount of blur BK1 and the phase image correlation value information PCC will now be described.

FIG. 5A to FIG. 5F show an example of a relationship between the amount of blur BK1 and the phase image correlation value information PCC.

In the present embodiment, two real space images are captured using a dark F value (F/8) and a bright F value (F/4), and depth information is determined by using phase image correlation value information PCC obtained from these real space images.

When an image is captured with a dark F value (F/8), a pan focus image is obtained that is sharply focused through the whole range from the focal position to the background (or the foreground).

On the other hand, when an image is captured with a bright F value (F/4), an image with a blurred background (or foreground) is obtained.

In this case, a random pattern image (original image) having 101 pixels by 101 pixels and a blurred image (comparative image) obtained by applying a Gaussian filter to the original image, are prepared as two real space images (selected region images) used for the depth information acquisition process.

The original image is an image in which a random pattern is depicted sharply throughout the whole image region, and is assumed to be a pan focus image obtained by image capture using a dark F value (F/8).

The comparative image is an image in which the random pattern is blurred by applying a Gaussian filter, and is assumed to be an image (an image with a blurred background (or foreground)) obtained by image capture using a brightness F value (F/4).

FIGS. 5A to 5F show a change in the phase image correlation value information PCC when the standard deviation σ of the Gaussian filter is changed. Changing the standard deviation σ of the Gaussian filter represents the blur becoming larger as the subject becomes more distant from the focal position.

First, a case when the subject is situated at the focal position will be described.

If the subject is situated at the focal position, then an image of the subject is captured without any blurring. Therefore, even if the F value is different, the two real space images are substantially the same, and the maximum value of the phase image correlation value information is "1" or a "value close to 1".

Figure 5A:
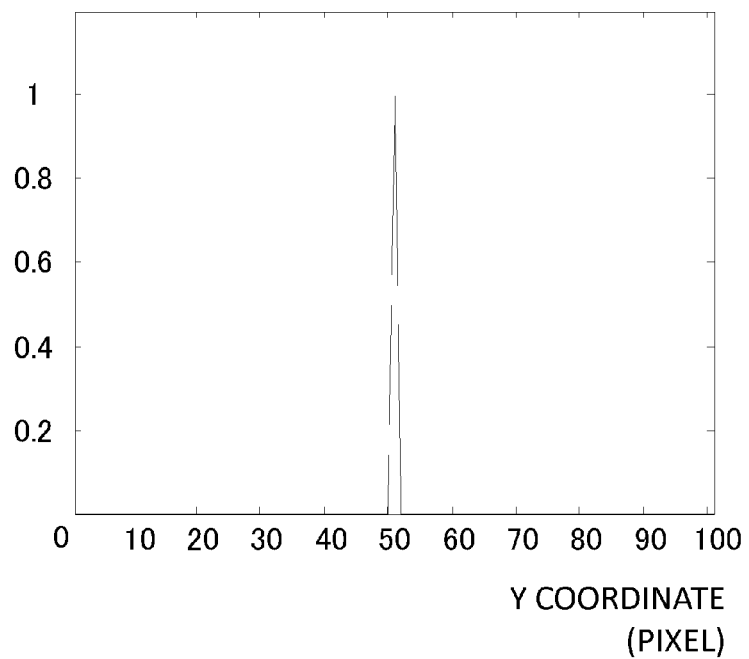
FIGS. 5A to 5F are diagrams showing one example of phase image correlation value information.

FIG. 5A shows a graph of the phase image correlation value information in a case when the original image and the comparative image are the same (when σ=0.1).

The graph of the phase image correlation value information PCC becomes a maximum in the central portion of the image (Y=51). In FIG. 5A, the maximum value of the phase image correlation value information PCC is "1". In this way, when the original image and the comparative image are the same, the maximum value of the phase image correlation value information PCC is "1". This means that the correlation values of the respective frequency components in the image are aligned to "1" and the images are matching even with respect to the details of the high-frequency components.

Next, a case when the subject is situated at a position distanced from the focal position (when σ=0.7) will be described.

In this case, in the image captured with a bright F value (comparative image), the subject is blurred, but, in the pan focus image captured with a dark F value (original image), the subject is not blurred.

When the image becomes blurred, the gradient of the edge portions becomes smoother and the high-frequency components (contrast) are reduced.

The real space phase image represents the edge portions (outline portions) of the image, and it is possible to determine slight changes in the edge portions, with good sensitivity, by using the frequency space phase image. More specifically, a change in the edge portions is represented as a change in the phase of the high-frequency components in the frequency space. If the two real space images have exactly the same blur, then a slight deviation in the phase of the high-frequency components produces no correlation, but, in the present embodiment, two real space images having different blur are used, and, therefore, a correlation is produced even if there is a slight deviation in the phase of the high-frequency components. This appears as a fall in the maximum value of the phase image correlation value information PCC obtained from the frequency space phase images of the original image and the comparative image.

Figure 5B:
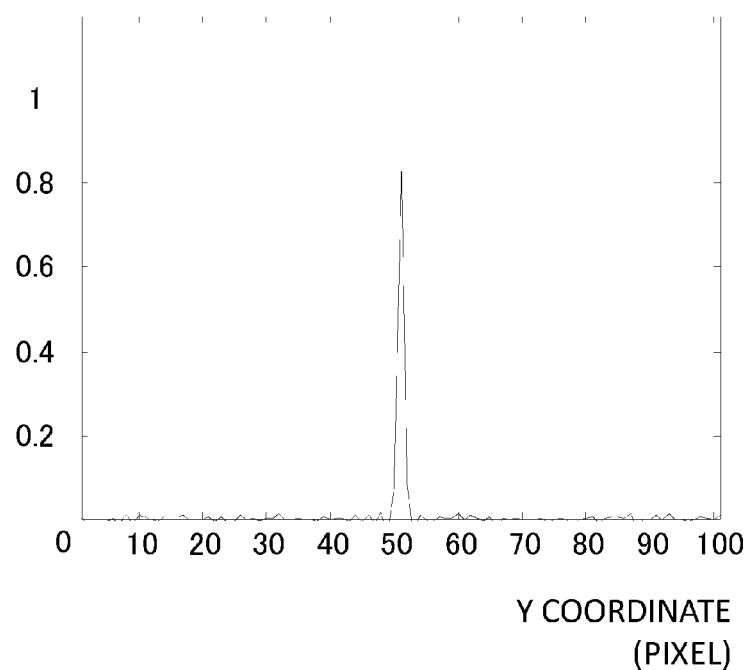

FIG. 5B shows a graph of the phase image correlation value information obtained from an original image and a comparative image to which a Gaussian filter with a standard deviation of $\sigma=0.7$ is applied.

In FIG. 5B, it can be seen that the maximum value of the phase image correlation value information PCC is "0.8287", and the maximum value of the phase image correlation value information PCC has fallen due to the blurring of the comparative image.

Next, cases are described in which the subject is situated at a position further distanced from the focal position ($\sigma=1.0$, 1.5, 2.0 and 3.0).

Figure 5C:
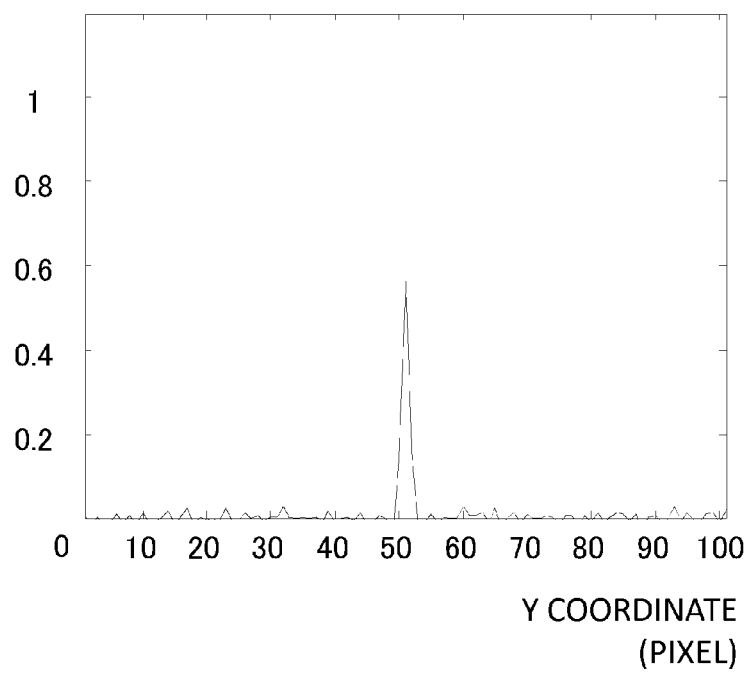

FIG. 5C shows a graph of the phase image correlation value information obtained from an original image and a comparative image to which a Gaussian filter with a standard deviation of $\sigma=1.0$ is applied. The maximum value of the phase image correlation value information PCC in this case is "0.5627". In this way, if the comparative image is blurred to a greater extent than that shown in FIG. 5B, the maximum value of the phase image correlation value information PCC falls further.

Figure 5D:
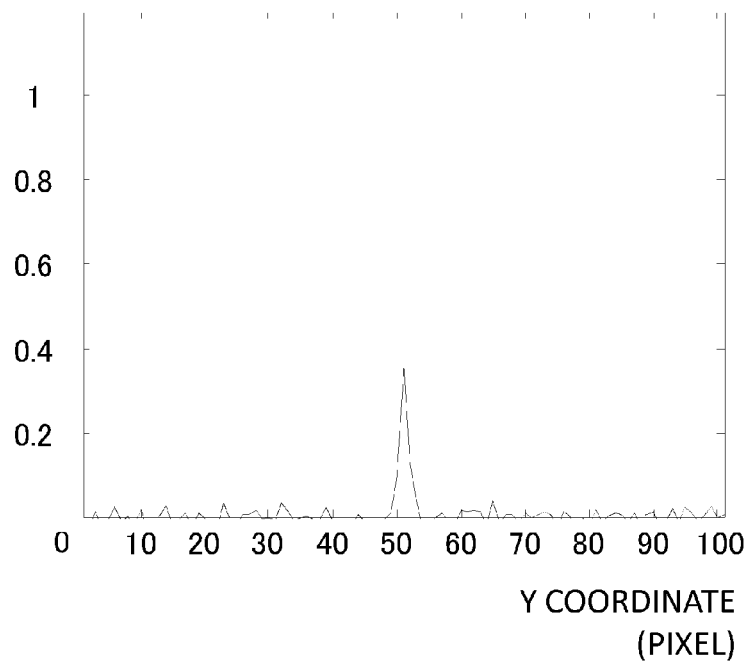

FIG. 5D shows a graph of the phase image correlation value information obtained from an original image and a comparative image to which a Gaussian filter with a standard deviation of $\sigma=1.5$ is applied. The maximum value of the phase image correlation value information PCC in this case is "0.3514".

Figure 5E:
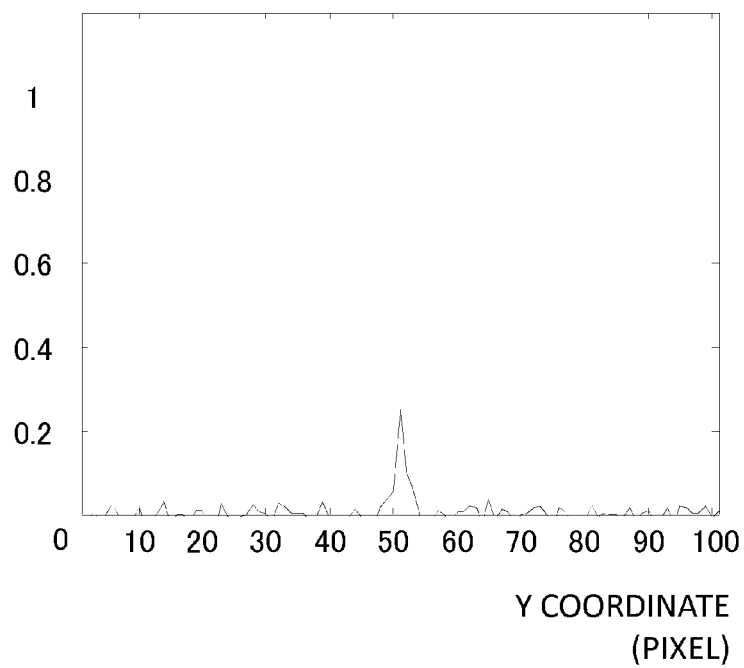

FIG. 5E shows a graph of the phase image correlation value information obtained from an original image and a comparative image to which a Gaussian filter with a standard deviation of $\sigma=2.0$ is applied. The maximum value of the phase image correlation value information PCC in this case is "0.2513".

Figure 5F:
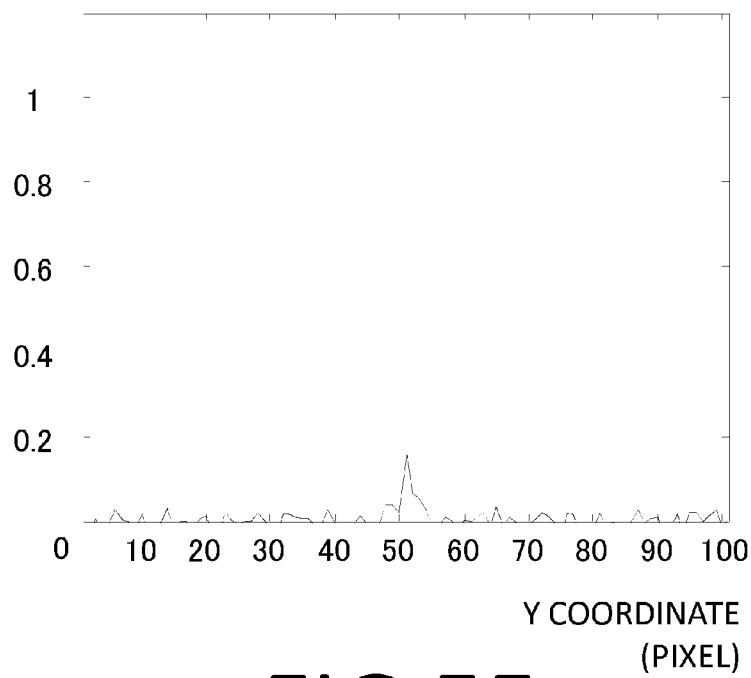

FIG. 5F shows a graph of the phase image correlation value information obtained from an original image and a comparative image to which a Gaussian filter with a standard deviation of $\sigma=3.0$ is applied. The maximum value of the phase image correlation value information PCC in this case is "0.1536".

Table 1 shows a relationship between the standard deviation $\sigma$ and the maximum value of the phase image correlation value information (peak maximum value).

TABLE 1

| Standard deviation of Gaussian filter | Maximum value of peak |
|---|---|
| Original image and comparative image are the same ($\sigma = 0.1$) | 1.0000 |
| $\sigma = 0.7$ | 0.8287 |
| $\sigma = 1.0$ | 0.5627 |
| $\sigma = 1.5$ | 0.3514 |
| $\sigma = 2.0$ | 0.2513 |
| $\sigma = 3.0$ | 0.1563 |

In this way, the maximum value of the phase image correlation value information PCC changes in accordance with the magnitude of the blur, and from this relationship, it is possible to determine the amount of defocus of the subject and the image depth, and hence, the object depth can be calculated.

In this way, the present embodiment acquires depth information by utilizing the fact that the maximum value of the phase image correlation value information PCC obtained from two frequency space phase images FP1, FP2 having different amounts of blur changes in accordance with the distance from the focal position.

Furthermore, since the brightness of the peripheral region is averaged out when the real space image is blurred, then a change in brightness occurs in which the brightness of the bright points declines and the brightness of the dark points increases. A similar effect occurs with the chromaticity, in that when the real space image is blurred, the peripheral colors become mixed together, and a change in the chromaticity arises.

In contrast to this, in the present embodiment, phase images from which brightness and chromaticity information have been removed are used, and, therefore, dependence on the subject is reduced, and in particular, it is possible to acquire depth information that is robust with respect to the brightness and chromaticity.

When acquiring depth information using a DFD method, it is necessary to have two images having different blur, but image capture needs to be carried out two times in order to capture two images. Since there is a time differential between the two image capture actions, then positional deviation may occur between the two images, due to movement of the subject or movement of the image pickup apparatus in this time differential.

With a DFD method, it is necessary to select a region at substantially the same position in each of the two images, as the processing region, but if there is positional deviation between the images, then regions having substantially different positions are selected as the processing regions, and there is a problem in that accurate depth information cannot be acquired.

If a correlation between frequency space phase images (frequency space correlation value information) is acquired, as in the present embodiment, and this frequency space correlation value information is converted into real space correlation value information, then the positional deviation between images is represented by positional deviation in the real space correlation value information, but this does not have a great effect on the maximum value of the real space correlation value information. Therefore, in the present embodiment, a merit is also obtained in that highly accurate depth information can be acquired even when there is positional deviation between the two images. In other words, according to the present embodiment, it is possible to acquire highly accurate depth information at all times, in a manner that is robust with respect to positional deviation between the images.

In principle, the DFD method can determine highly accurate depth information. Nevertheless, with DFD methods used thus far, it has not necessarily been possible to obtain highly accurate depth information due to variation in the brightness and chromaticity of the subject, and positional deviation, and the like, between images.

However, according to the present embodiment, it is possible to reduce the effects of deviation in the image brightness and chromaticity, and positional deviation between images, on the depth information that represents the depth to the subject, and, therefore, highly accurate depth information can be acquired more reliably (in a stable fashion at all times).

The depth to the subject is represented well as a difference in blur in the edge portion of the real space image (the portion where the spatial frequency is high). Therefore, as frequency space correlation value information, it is possible to calculate a correlation value for each frequency of the high-frequency region (the correlation value between frequency space phase images), as frequency space correlation value information.

In the present embodiment, an example was described in which two real space images are captured in order to acquire depth information, but it is also possible to capture three or more real space images, and to acquire depth information by using two real space images of the captured three or more real space images.

Second Embodiment

The composition of the depth information acquisition apparatus relating to the second embodiment is similar to the first embodiment, but the depth information acquisition method employed in the depth information acquisition unit differs between the second embodiment and the first embodiment. More specifically, in the present embodiment, the depth information acquisition processing unit acquires depth information on the basis of the width of the peak of the phase image correlation value information PCC.

Figure 6:
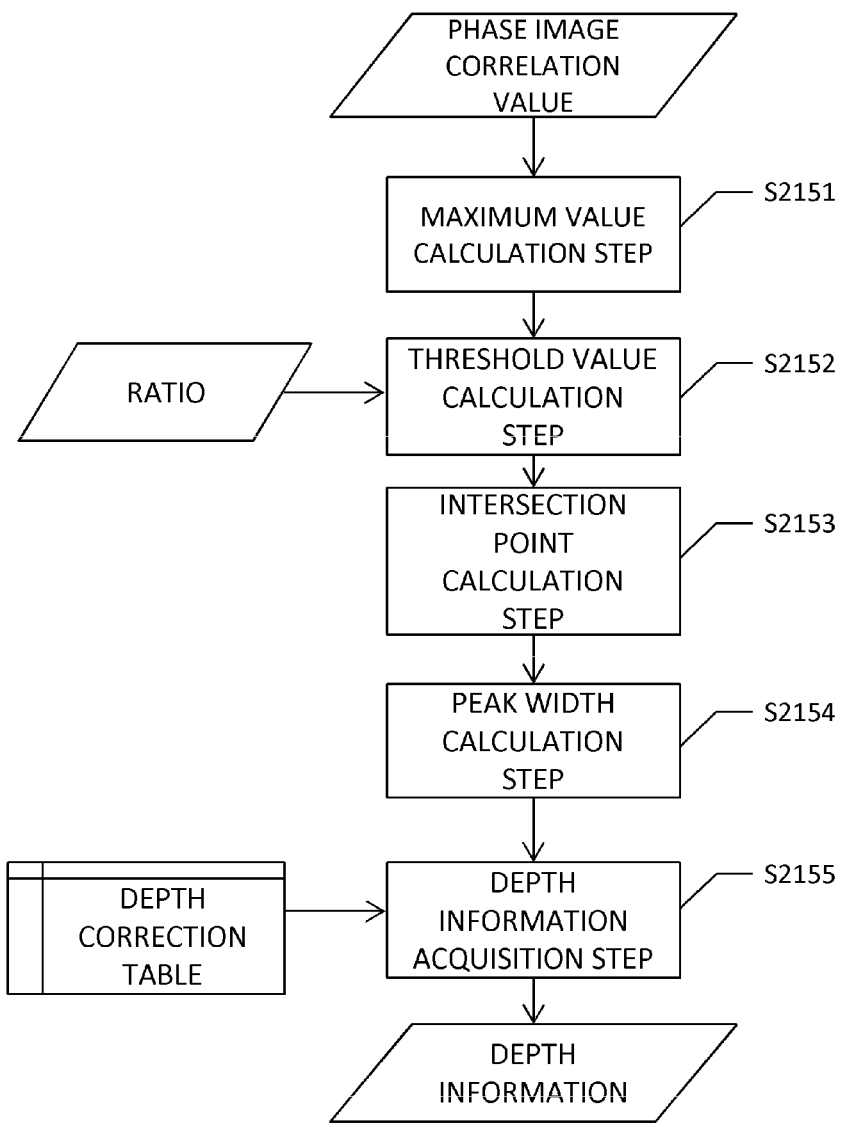
FIG. 6 is a flowchart of a depth information acquisition processing unit relating to a second embodiment of the present invention.

FIG. 6 shows a flowchart of the depth information acquisition processing unit according to the present embodiment.

A maximum value of the phase image correlation value information PCC is calculated in a maximum value calculation step S2151.

A threshold value for calculating the peak width is calculated in a threshold value calculation step S2152. In the present embodiment, the threshold value is calculated by multiplying the maximum value of the phase image correlation value information PCC by a prescribed ratio. In the present embodiment, the prescribed ratio is set to 30%, but the rate may also be set to 50%, 35% (1/e), 20%, 13.5% (1/e2), and so on. It is also possible to determine the change in the phase image correlation value information PCC accurately if the threshold value is set to a low value, which is effective in cases when it is desired to acquire accurate depth information in the vicinity of the focal position. On the other hand, if the threshold value is set high, it is also possible to avoid the effects of noise, even if the object is very distant from the focal position and the image is greatly blurred, which is effective in cases when it is desired to acquire depth information in a broad range.

Next, a point at which the phase image correlation value information PCC intersects with the threshold value is calculated in an intersection point calculation step S2153. There are at least two of these intersection points, and depending on the circumstances, there may be three or more intersection points. Here, two intersection points at the peak of the phase image correlation value information PCC are calculated.

The interval between the two intersection points are calculated as the width, in a peak width calculation step S2154. More specifically, in the present embodiment, the width between two points at which the value of the real space correlation value information is equal to the threshold value, in the peak region of the phase image correlation value information PCC, is calculated as the width of the peak of the phase image correlation value information PCC.

The width of the peak of the phase image correlation value information PCC is related to the magnitude of the blur of the image and can be used as original data for the depth information.

In a depth information acquisition step S2155, depth information (the depth to the subject) is acquired by using the width of the peak of the phase image correlation value information PCC and a depth correction table (a table representing a correspondence relationship between the width of the peak of the phase image correlation value information PCC, and the depth information).

Table 2 shows the width (peak width) obtained from the graph of the phase image correlation value information PCC shown in FIG. 5A to FIG. 5F, when the prescribed ratio is 30%.

TABLE 2

| Standard deviation of Gaussian filter | Width of peak |
| --- | --- |
| Original image and comparative image are the same ($\sigma = 0.1$) | 1.4000 (pixels) |
| $\sigma = 0.7$ | 1.5409 (pixels) |
| $\sigma = 1.0$ | 1.8684 (pixels) |
| $\sigma = 1.5$ | 2.2489 (pixels) |
| $\sigma = 2.0$ | 2.6238 (pixels) |
| $\sigma = 3.0$ | 3.0498 (pixels) |

In this way, the width of the peak of the phase image correlation value information PCC is related to the magnitude of the blur of the image. Consequently, it is possible to calculate the object depth of the subject from the width of the peak of the phase image correlation value information PCC.

According to the present embodiment, similarly to the first embodiment, it is possible to acquire depth information that is robust with respect to the brightness and chromaticity of the subject.

Therefore, if a correlation between frequency space phase images (frequency space correlation value information) is acquired as in the present embodiment, and this frequency space correlation value information is converted into real space correlation value information, then the positional deviation between images is represented by a deviation of the coordinates in the real space correlation value information, but this does not have a great effect on the peak width of the phase image correlation value information. Therefore, in the present embodiment, a merit is also obtained in that highly accurate depth information can be acquired even when there is positional deviation between the two images. In other words, according to the present embodiment, it is possible to acquire accurate depth information at all times, in a manner that is robust with respect to positional deviation between the images.

Figure 7:
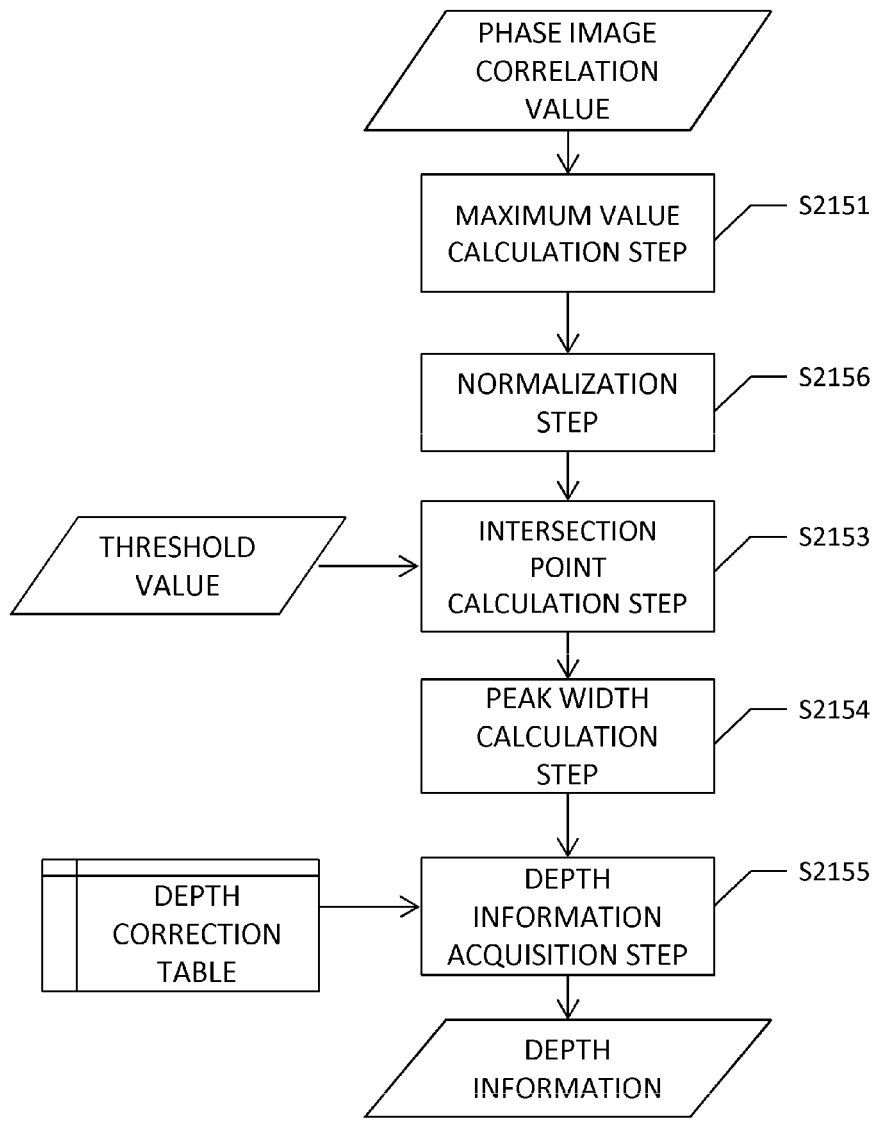
FIG. 7 is a flowchart of a depth information acquisition processing unit relating to a second embodiment of the present invention.

The flowchart of the depth information acquisition processing unit may also be as shown in FIG. 7.

In FIG. 7, a normalization step S2156 is added after the maximum value calculation step S2151.

In the normalization step S2156, the value of the phase image correlation value information is normalized by the maximum value. In other words, each value of the phase image correlation value information is divided by the maximum value. Therefore, the phase image correlation value information is normalized in such a manner that the maximum value is "1". By normalizing the phase image correlation value information, the threshold value is kept uniform at all times. Therefore, it is possible to prepare the threshold value in advance and there is no need to calculate a threshold value.

In the intersection point calculation step 2153, two intersection points are calculated using the previously prepared threshold value, similarly to that shown in FIG. 6. More specifically, the intersection point between the phase image correlation value information after normalization, and the threshold value, is calculated. Thereupon, similarly to that shown in FIG. 6, the peak width calculation step S2154 and the depth information acquisition step S2155 are carried out. In other words, the depth information is acquired on the basis of the peak of the real space correlation value information after normalization.

The width of the peak is not limited to the width between two points at which the value of the real space correlation value information is equal to the threshold value. For example, the width of the peak may also be the full width at half maximum value of the peak, or the maximum width.

Third Embodiment

The composition of the depth information acquisition apparatus relating to the third embodiment is similar to the first embodiment, but the depth information acquisition method employed in the depth information acquisition unit differs between the third embodiment and the first embodiment. In the present embodiment, a composition is described in which highly accurate depth calculation can be achieved even if there is positional deviation between the two real space images used for acquiring the depth information. More specifically, in the present embodiment, an amount of deviation of the subject position between two real space images that are used to acquire depth information is calculated from the phase image correlation value information, and depth information is acquired on the basis of the peak characteristics of the phase image correlation value information, and the calculated amount of deviation. Consequently, it is possible to acquire highly accurate depth information, even if there is positional deviation between the two real space images.

Figure 8:
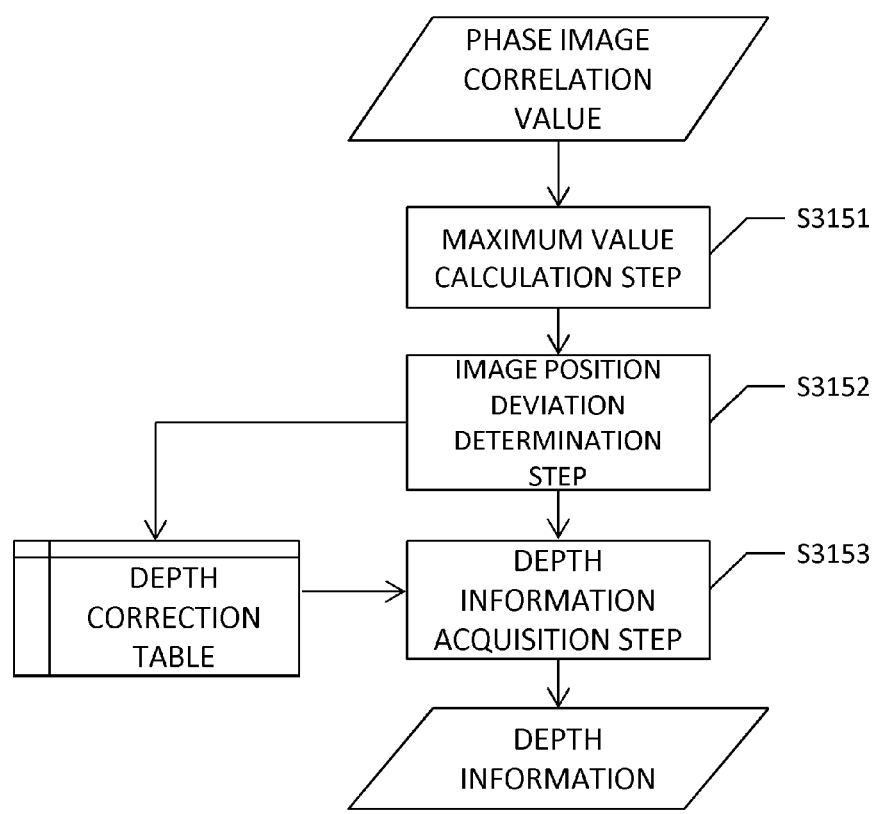
FIG. 8 is a flowchart of a depth information acquisition processing unit relating to a third embodiment of the present invention.

FIG. 8 shows a flowchart of the depth information acquisition processing unit according to the present embodiment.

Similarly to the first embodiment, in a maximum value calculation step S3151, the maximum value of the phase image correlation value information PCC is calculated.

Next, the amount of positional deviation between the two real space images is calculated (determined) in an image amount of positional deviation determination step S3152. If the correlation value between the frequency space phase images (frequency space correlation value information) is acquired and the frequency space correlation value information is converted to real space correlation value information, as shown in present embodiment, then the positional deviation between the images is represented as a positional deviation in the real space correlation value information. Therefore, it is possible to determine the amount of positional deviation between the two captured real space images, by using the real space correlation value information.

In the present embodiment, the amount of deviation from a central position, of the position where the phase image correlation value information is a maximum, is determined, and the amount of deviation in the positions of the two real space images that have been captured can be determined accurately to a sub-pixel precision.

The depth information is acquired in the depth information acquisition step S3153 by using the calculated (determined) amount of deviation, and a depth correction table (a table representing a correspondence relationship between the maximum value of the peak and the depth information). For example, a depth correction table is prepared in advance for each amount of deviation. In this case, it is possible to acquire depth information by a method similar to that of the first embodiment, by using a depth correction table corresponding to the calculated amount of deviation. Furthermore, the depth correction table, or the depth information obtained by using the depth correction table, may be corrected in accordance with the amount of deviation.

In this way, in the present embodiment, the amount of deviation in the position of the images is determined, and depth information is acquired by taking account of the amount of deviation, and, therefore, it is possible to acquire depth information of higher accuracy than the first and second embodiments.

In the present embodiment, depth information is acquired by using the maximum value of the peak of the phase image correlation value information, but the invention is not limited to this. It is also possible to acquire depth information by using the width of the peak of the phase image correlation value information, as in the second embodiment.

Aspects of the present invention can also be realized by a computer of a system or an apparatus (or devices such as a CPU or an MPU) that reads out and executes a program recorded on a memory device to perform the functions of the above-described embodiment(s), and by a method, the steps of which are performed by a computer of a system or an apparatus by, for example, reading out and executing a program recorded on a memory device to perform the functions of the above-described embodiment(s). For this purpose, the program is provided to the computer, for example, via a network or from a recording medium of various types serving as the memory device (e.g., a non-transitory computer-readable medium). Therefore, the computer (including the device such as a CPU or an MPU), the method, the program (including a program code and a program product), and the non-transitory computer-readable medium recording the program are all included within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A depth information acquisition apparatus that acquires depth information of a subject by using two real space images, each having a different blur value, that are obtained by capturing a subject with different imaging parameters, the apparatus comprising:
   (A) at least one processor; and
   (B) at least one memory storing instructions that, when executed by the processor, cause the processor to perform the steps of:
   (a) converting the two real space images into two frequency space images, the frequency space images each having a frequency comprising at least one frequency ingredient and an amplitude;
   (b) generating a frequency space phase image for each of the frequency space images by dividing each frequency ingredient by the amplitude of each respective frequency space image, each frequency space phase image using a frequency;

(c) calculating frequency space correlation value information representing a correlation value for each frequency between the frequencies of the two frequency space phase images;

(d) converting the frequency space correlation value information into real space correlation value information, the real space correlation value information having a peak maximum value; and (e) acquiring the depth information, based on the peak maximum value of the real space correlation value information.

2. The apparatus according to claim 1, wherein the instructions further cause the processor to perform the step of acquiring the depth information on the basis of the peak maximum value of the real space correlation value information.

3. The apparatus according to claim 1, wherein the instructions further cause the processor to perform the step of acquiring the depth information on the basis of a width of the peak maximum value of the real space correlation value information.

4. The apparatus according to claim 3, wherein the width is a width between two points at which the value of the real space correlation value information is equal to a threshold value, at the peak maximum value of the real space correlation value information.

5. The apparatus according to claim 1, wherein the instructions further cause the processor to perform:
normalizing the value of the real space correlation value information by the peak maximum value; and
acquiring the depth information on the basis of a width of the peak maximum value of the real space correlation value information after the normalization.

6. The apparatus according to claim 1, wherein correspondence information indicating a correspondence relationship between the peak maximum value of real space correlation value information and the depth information is prepared in advance, and the instructions further cause the processor to perform the step of acquiring the depth information on the basis of the peak maximum value obtained by the converting step and the correspondence information.

7. The apparatus according to claim 1, wherein the instructions further cause the processor to perform:
calculating an amount of deviation in a subject position between the two real space images used to acquire depth information, from the real space correlation value information, and acquiring the depth information on the basis of the the peak maximum value and the amount of deviation.

8. The apparatus according to claim 1, wherein the frequency space correlation value information represents a correlation value for each frequency of a high-frequency region.

9. The apparatus according to claim 1, wherein the instructions further cause the processor to perform the step of converting the two real space images to the two frequency space images by using a two-dimensional Fourier transform.

10. The apparatus according to claim 1, wherein the instructions further cause the processor to perform the step of converting the frequency space correlation value information into the real space correlation value information by using a two-dimensional inverse Fourier transform.

11. An image pickup apparatus comprising:
an imaging optical system;
an imaging element; and
the depth information acquisition apparatus according to claim 1, wherein the depth information acquisition apparatus acquires the depth information by using the two real space images that are obtained by the imaging optical system and the imaging element.

12. A depth information acquisition method of acquiring depth information of a subject by using two real space images, each having a different blur value, that are obtained by capturing a subject with different imaging parameters, the method comprising the steps of:
converting the two real space images to two frequency space images, the frequency space images each having a frequency comprising at least one frequency ingredient and an amplitude;
generating a frequency space phase image for each of the two frequency space images by dividing each frequency ingredient by the amplitude of each respective frequency space image, each frequency space phase image using a frequency;
calculating frequency space correlation value information representing a correlation value for each frequency between the frequencies of the two frequency space phase images;
converting the frequency space correlation value information into real space correlation value information, the real space correlation value information having a peak maximum value; and
acquiring the depth information of the subject, on the basis of based on the peak maximum value of the real space correlation value information.

13. A non-transitory computer-readable storage medium storing an executable program for causing a computer to execute the method according to claim 12.

14. A depth information acquisition apparatus that acquires depth information of a subject by using two real space images, each having a different blur value, that are obtained by capturing a subject with different imaging parameters, the apparatus comprising:
at least one processor that:
(a) converts the two real space images into two frequency space images, the frequency space images each having a frequency comprising at least one frequency ingredient and an amplitude;
(b) generates a frequency space phase image for each of the frequency space images by dividing each frequency ingredient by the amplitude of each respective frequency space image, each frequency space phase image using a frequency;
(c) calculates frequency space correlation value information representing a correlation value for each frequency between the frequencies of the two frequency space phase images;
(d) converts the frequency space correlation value information into real space correlation value information, the real space correlation value information having a peak maximum value; and
(e) acquires the depth information, based on the peak maximum value of the real space correlation value information.

* * * * *